(12) United States Patent
Davidov

(10) Patent No.: US 9,165,138 B2
(45) Date of Patent: Oct. 20, 2015

(54) MITIGATION OF FUNCTION POINTER OVERWRITE ATTACKS

(75) Inventor: Mlkhail Davidov, Seattle, WA (US)

(73) Assignee: Leviathan Security Group, Inc., Seattle, WA (US)

(*) Notice: Subject to any disclaimer, the term of this patent is extended or adjusted under 35 U.S.C. 154(b) by 167 days.

(21) Appl. No.: 13/546,905

(22) Filed: Jul. 11, 2012

(65) Prior Publication Data

US 2014/0020092 A1 Jan. 16, 2014

(51) Int. Cl.
*G06F 21/00* (2013.01)
*G06F 21/54* (2013.01)

(52) U.S. Cl.
CPC ........................... *G06F 21/54* (2013.01)

(58) Field of Classification Search
CPC ......... G06F 21/52; G06F 21/54; G06F 21/14; G06F 21/566; G06F 21/577; G06F 21/125; G06F 21/554; G06F 21/51; G06F 21/00; G06F 21/56; G06F 21/73; G06F 12/14; H04L 63/1416; H04L 63/1441
USPC ...................................................... 726/22–25
See application file for complete search history.

(56) References Cited

U.S. PATENT DOCUMENTS

| | | | |
|---|---|---|---|
| 5,944,821 A * | 8/1999 | Angelo | 726/22 |
| 2001/0044904 A1 * | 11/2001 | Berg et al. | 713/201 |
| 2008/0015808 A1 * | 1/2008 | Wilson et al. | 702/123 |
| 2008/0216175 A1 * | 9/2008 | Pike | 726/22 |
| 2009/0320136 A1 * | 12/2009 | Lambert et al. | 726/25 |
| 2012/0297057 A1 * | 11/2012 | Ghosh et al. | 709/224 |
| 2013/0086550 A1 * | 4/2013 | Epstein | 717/110 |

* cited by examiner

*Primary Examiner* — Yin-Chen Shaw
*Assistant Examiner* — John B King
(74) *Attorney, Agent, or Firm* — Barcelo, Harrison & Walker LLP

(57) ABSTRACT

Methods are disclosed for improving security of computer software and preventing potential attackers from gaining control of computer software via function pointer overwrite attacks. One or more additional layers of complexity may be imposed that would have to be circumvented in order to gain execution control over portions of software. One or more function pointers can be encoded using a value that may be generated on program initialization and decoded before any dynamic function call occurs. In the event of memory corruption that affects an encoded function pointer, the value will cause the destination of the function pointer to decode to an invalid and random address and will induce an error. An application may be prevented from calling an attacker corrupted function pointer by introducing various checks around the call point at compile time that check the validity of the destination to which the function pointer points.

52 Claims, 3 Drawing Sheets

US 9,165,138 B2

MITIGATION OF FUNCTION POINTER OVERWRITE ATTACKS

BACKGROUND OF THE DISCLOSURE

1. Field of the Disclosure

The disclosure generally relates to security of computer programs executed on computing devices, and more particularly to systems and methods for mitigating function pointer overwrite attacks on a portion of a computer program.

2. General Background

With the advent of advanced memory protections and vulnerability mitigations in software, attackers have been forced to use more complicated and challenging techniques to gain code execution. Due to the proliferation of DEP (Data Execution Protection) and ASLR (Address Space Layout Randomization) attackers are more and more relying on a technique called ROP (Return Oriented Programming) to circumvent these protections. ROP can be used to exploit certain types of memory corruption bugs introduced by developers such as buffer overflows and use after free conditions to modify heap or stack stored function pointers which are called later to gain limited control of execution by switching the executing process' stack context to a specially crafted one supplied by the attacker with the ultimate goal of gaining full control of execution.

One approach that can be used by attackers in the presence of DEP and ASLR to gain full code execution, is as follows:
  Find an appropriate bug that would allow for a function pointer to overwrite.
  Bypass ASLR in a module by either finding another vulnerability that leads to "information disclosure" about the address space, or force the loading of another module (such as a DLL library) that is not protected by ASLR into the address space.
  Locate a stack pivot in the bypassed module which changes the context of the stack to that of the attackers.
  Overwrite a function pointer with the location (address) of the stack pivot.
  Force the application to call the function pointer to begin executing the ROP payload.
  The ROP payload then must bypass DEP via either allocating new memory or disabling DEP on the actual functional payload.
  The ROP payload then calls the functional payload which now has full control of the execution.

There is a need in the art for security measures that implement additional safeguards to prevent attackers from gaining execution control of a software program.

There is a need in the art for security measures that implement additional safeguards to prevent attackers from executing function pointer overwrite attacks on a portion of a software program.

SUMMARY OF THE DISCLOSURE

In certain embodiments, a method is disclosed for mitigating a function pointer overwrite attack on a portion of a computer program, comprising: selecting one or more function pointer targets; allocating a space prior to each of the one or more function pointer targets; instantiating a runtime protection key for one or more of the function pointer targets; storing the runtime protection key in the allocated space prior to each of the one or more function pointer targets; comparing the value in the allocated space prior to at least one of the function pointer targets to the runtime protection key when an instruction is called that accesses the at least one of the function pointer targets; and generating an error if the value in the space prior to any of the at least one of the function pointer targets does not match the runtime protection key or executing the instruction if the value in the space prior to the at least one of the function pointer targets matches the runtime protection key. Instantiating a runtime protection key may comprise initializing the runtime protection key to a value. The value may be non-deterministic. The value may comprise a random value. The value may comprise a processor instruction. The value may comprise an environment specific identifier. The environment specific identifier may comprise a selected one of a processor serial number and a process identifier. In certain embodiments, the value can only be used for the step of comparing function pointers for one instance of a program. The value may be dynamic. The runtime protection key may be derived from at least one of a combination of and a transformation of a plurality of values. The plurality of values may comprise one or more of a function pointer address and a load time generated value unique to a function pointer target. Instantiating a runtime protection key may comprise initializing the runtime protection key to a function pointer address of one of the function pointer targets. Storing the runtime protection key may comprise storing the one of the function pointer targets in the allocated space prior to a corresponding function pointer target. Instantiating a runtime protection key for one or more of the function pointer targets may comprise initializing the runtime protection key to a load time generated value unique to a corresponding function pointer target. Storing the runtime protection key may comprise storing the load time generated value in the allocated space prior to the corresponding function pointer target. The step of selecting one or more function pointer targets may comprise selecting one or more function pointer targets for protection. The instruction may store at least one of the function pointer targets to point to the at least one protected function pointer targets. The instruction may modify the control flow that accesses at least one of the protected function pointer targets to point to at least one function pointer targets. The step of comparing may occur before executing executable code associated with the function. At least one of the steps of allocating, instantiating and storing may be performed at least in part by a compiler. At least one of the steps of allocating, instantiating and storing may be performed at least in part by an operating system. The step of comparing may be performed at least in part by an operating system. At least one of the steps of allocating, instantiating and storing may be performed at least in part by a processor. At least one of the steps of allocating, instantiating and storing may be performed at least in part by an application. The step of comparing may be performed at least in part by a processor. The step of comparing may be performed at least in part by an application. A target of each of the first set of function pointers may be executable code.

In certain embodiments, a non-transitory computer readable medium containing instructions for mitigating a function pointer overwrite attack on a portion of a computer program is disclosed, comprising instructions for: selecting one or more function pointer targets for protection; allocating a space prior to each of the one or more function pointer targets; instantiating a runtime protection key for one or more of the function pointer targets; storing the runtime protection key in the allocated space prior to each of the one or more function pointer targets; comparing the value in the space prior to at least one of the function pointer targets to the runtime protection key when an instruction is called that dynamically modifies the control flow to access the at least one of the function pointer targets; and generating an error if the value in the space prior to any of the at least one of the function pointer targets does not match the runtime protection key or executing the instruction if the value in the space prior to each of the at least one of the function pointer targets matches the runtime protection key. Instantiating a runtime protection key may comprise initializing the runtime protection key to a value. The value may be non-deterministic. The value may comprise a random value. The value may comprise a processor instruction. The value may comprise an environment specific identifier. The environment specific identifier may comprise a selected one of a processor serial number and a process identifier. In certain embodiments, the value can only be used by the instructions for comparing function pointers for one instance of a program. The runtime protection key may be derived from at least one of a combination of and a transformation of a plurality of values. The plurality of values may comprise one or more of a function pointer address and a load time generated value unique to a function pointer target. Instantiating a runtime protection key may comprise initializing the runtime protection key to a function pointer address of one of the function pointer targets. Storing the runtime protection key may comprise storing the one of the function pointer targets in the allocated space prior to a corresponding function pointer target. Instantiating a runtime protection key for one or more of the function pointer targets may comprise initializing the runtime protection key to a load time generated value unique to a corresponding function pointer target. Storing the runtime protection key may comprise storing the load time generated value in the allocated space prior to the corresponding function pointer target. Selecting one or more function pointer targets may comprise selecting one or more function pointer targets for protection. The instruction may store at least one of the function pointer targets to point to the at least one protected function pointer targets. The instruction may modify the control flow that accesses at least one of the protected function pointer targets to point to at least one function pointer targets. The instructions for comparing may be executed before executing executable code associated with the function. At least one of the instructions for allocating, instantiating and storing may be executed at least in part by a compiler. At least one of the instructions for allocating, instantiating and storing may be executed at least in part by an operating system. The instructions for comparing may be executed at least in part by an operating system. At least one of the instructions for allocating, instantiating and storing may be executed at least in part by an application. The instructions for comparing may be executed at least in part by an application. At least one of the instructions for allocating, instantiating and storing may be executed at least in part by a processor. The instructions for comparing may be performed at least in part by a processor. A target of each of the first set of function pointers may be executable code.

BRIEF DESCRIPTION OF THE DRAWINGS

By way of example, reference will now be made to the accompanying drawings.

DETAILED DESCRIPTION

Certain embodiments of methods and systems are disclosed for improving security of computer software and preventing potential attackers from gaining control of portions of computer software. In certain embodiments, one or more additional layers of complexity are imposed that a potential attacker would have to circumvent in order to gain execution control over portions of software. In certain embodiments, the potential attacker may be prevented from corrupting function pointers. In certain embodiments, an application may be prevented from calling an attacker corrupted function pointer by introducing various checks around the call point at compile time that check the validity of the destination to which the function pointer points.

Figure 1:
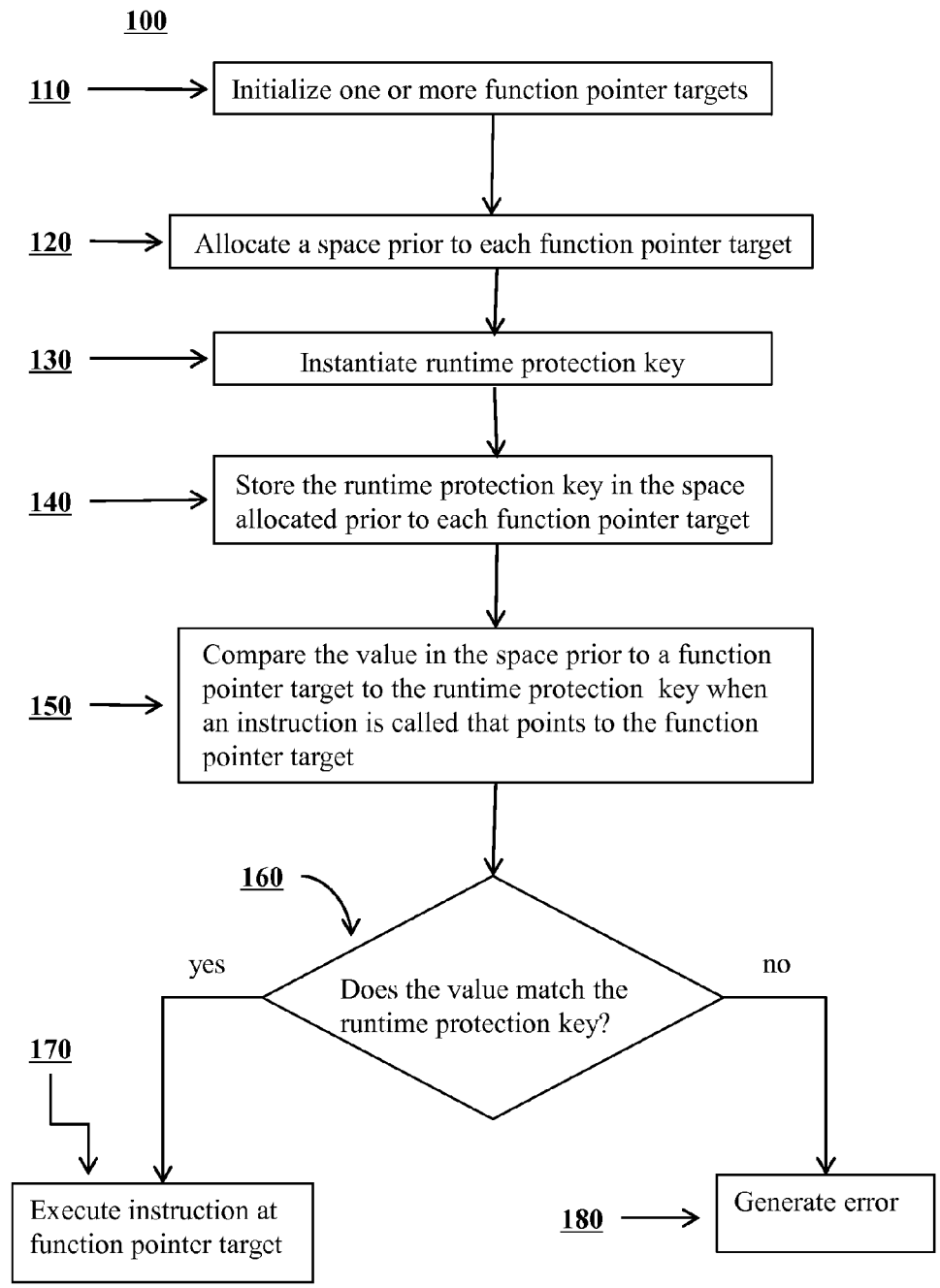
FIG. 1 illustrates a block diagram of a method for mitigating a function pointer overwrite attack on a portion of a computer program in accordance with certain embodiments of the present invention.

As shown in FIG. 1, a method for mitigating a function pointer overwrite attack on a portion of a computer program 100 may include the steps of selecting one or more function pointer targets 110, allocating a space prior to each function pointer target 120, instantiating a runtime protection key 130, and storing the runtime protection key in the space allocated prior to each function pointer target 140. The step of selecting one or more function pointer targets 110 may comprise selecting one or more function pointer targets for protection. When an instruction is called that points to a protected function pointer target, the value in the allocated space prior to that function pointer target can be compared to the runtime protection key 150. Instructions that point to a protected function pointer target include but are not limited to: (1) instructions that store at least one of the protected function pointer targets to point to the at least one protected function pointer targets; and (2) instructions that modify the control flow that accesses any of the protected function pointer targets to point to the corresponding protected function pointer targets. If the value in the allocated space matches the runtime protection key at 160, the instruction at the function pointer target to which access has been requested can execute normally 170. If the value in the allocated space does not match the runtime protection key at 160, an error can be generated 180 and/or access to the function pointer target can be prevented.

In certain other embodiments, a random value may be generated at program initialization and may be inserted immediately before destination points for function pointers. When a function pointer is called, the address immediately before the destination can be checked and validated against the generated value. The encoding may be executed as a compiler feature and may be generated and inserted into applications at compile time with little or no developer intervention required. A unique secret value may be generated and the operating system may iterate through a generated at compile time list performing substitution of the computed secret value at the address preceding each of the associated function pointer destinations. A unique secret value may be generated and the application may iterate through a generated at compile time list performing substitution of the computed secret value at the address preceding each of the associated function pointer destinations.

In certain embodiments, space may be allocated before one or more function entry-points or destinations 120. The allocated space may be for example and without limitation four or eight bytes. A random value can be generated on program start up 130 and stored in the newly allocated space 140. The data stored in the allocated space can then be checked immediately before a function call directed to the corresponding function call destination and compared to the expected value 150 to validate that the function pointer has not been overwritten or the function pointer destination corrupted. If the value in the allocated space does not match the random value, an error can be generated 180. Alternately or in addition to generating an error, if the value in the allocated space does not match the expected value, the program may prevent execution of the instruction at the particular function pointer target. If the value in the allocated space matches the expected value, the instruction at the function pointer destination or target may be executed 170. As long as the instantiated runtime protection key remains in the allocated space before protected function pointers, any attempt to access a protected function pointer target will operate normally. However, any attempt by a potential attacker to overwrite a protected function pointer to point to a location which has not been protected will generate an error and block execution of the code at the corrupted function pointer target rather than providing the attacker with program execution of the portion of the computer program associated with the corrupted function pointer target, thereby thwarting the attack. One of ordinary skill in the art will recognize that the value may be or be a combination of a random value, a processor instruction, an environment specific variable, or other values known to those of skill in the art. Possible environment specific variables include but are not limited to a processor serial number and a process identifier. The value may be non-deterministic.

As an additional security measure, a new value may be generated each time a computer program is initialized such that the value can only be used for protecting function pointers for one instance of a program to reduce the opportunity for an attacker to discover the value and use it to defeat the comparison check of steps 150-160 to permit execution of code at overwritten function pointer targets. The runtime protection key must be kept secure so an attacker cannot discover the runtime protection key and store the runtime protection key in the space before an overwritten function pointer target before steps 150-170 are executed. An instance of a placed runtime protection key may be derived from a combination or transformation of multiple values. The values may include the runtime protection key, the function pointer address, or a load time generated value unique to a function pointer target. The values may be non-deterministic.

The steps of instantiating, allocating, and storing may be performed at least in part by an operating system and also or alternately may be performed at least in part by a processor. The steps of instantiating, allocating, and storing may be performed at least in part by an operating system and also or alternately may be performed at least in part by the application. The steps of instantiating, allocating, and storing may be performed at compile time. Alternately, a set of instructions may be generated at compile time for performing the steps of instantiating, allocating, and storing, which may optionally be executed at program initialization by at least one of a compiler, an operating system, an application, and a processor. The step of comparing may be performed at least in part by an operating system and also or alternately may be performed at least in part by a processor or application. Alternately, a set of instructions may be generated at compile time for performing the steps of comparing, which may optionally be executed at runtime by at least one of an operating system and a processor.

In certain embodiments, the target of one of more of the first set of function pointers may be executable code. In certain embodiments, the target of each of the first set of function pointers may be executable code.

The following steps may be performed in a compiler to implement certain of the foregoing embodiments:
Initialize list of all dynamic instruction targets (functions) suitable for protection at module initialization.
Allocate space before every dynamic instruction target for the instantiated runtime_protection_key to be placed into at run-time.
Create pre-main stub to initialize runtime protection key into either the Process Environment Block (PEB) (Similar to generation of _security_cookie), a dedicated register or other known memory location and a routine to iterate through the list of functions and to instantiate and insert the runtime_protection_key in to the reserved space.
Expand all instructions that dynamically modify the control flow that are supposed to access protected functions such as call register or jmp register into:
push ecx
mov ecx, [register-4]
cmp ecx, [runtime_protection_key]
jnz report_failure
pop ecx
call/jmp register
In certain embodiments, the following steps may be taken by the compiler on the pre-main execution stub:
Initialize runtime_protection_key into the Process Environment Block (PEB)/dedicated register/known memory location to a random value.
Iterate through list of dynamic instruction targets and instantiate and place the runtime_protection_key into the space immediately preceding.
Execute main( ).
An operating system's program loader may be used to retrieve a list of function call instructions from the binary headers and the execution stub functionality may be implemented by the operating system's program loader.

In certain embodiments, one or more function pointers can be encoded using a value that may be generated at program initialization and decoded before any dynamic function call occurs. In the event of memory corruption that affects the function pointer, the value will cause the destination of the function pointer to decode to an invalid and random address and will induce an error. The encoding may be executed as a compiler feature and may be generated and inserted into applications at compile time with little or no developer intervention required. A unique secret value may be generated and the compiler may iterate through a generate at compile time list performing encoding of associated function pointer destinations.

Figure 2:
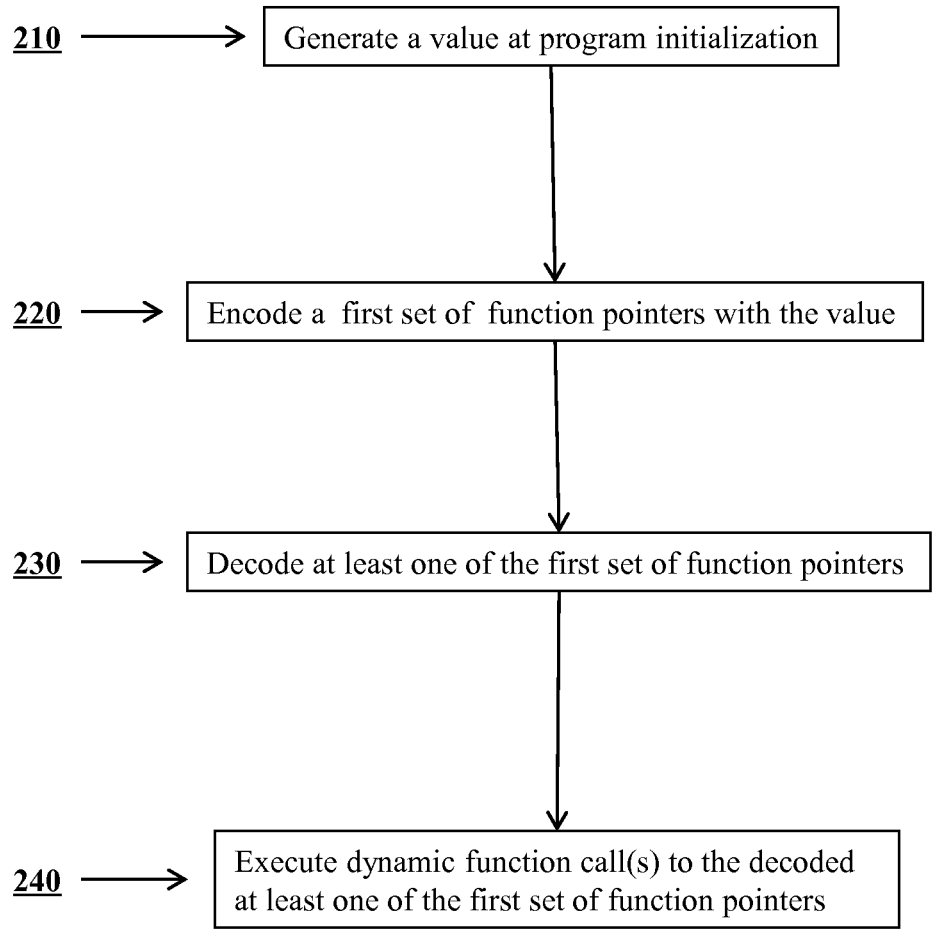
FIG. 2 illustrates a block diagram of a method for mitigating a function pointer overwrite attack on a portion of a computer program in accordance with certain embodiments of the present invention.

As shown in FIG. 2, a method of mitigating a function pointer overwrite attack 200 may include the steps of generating a value at program initialization 210 and encoding a first set of function pointers with the value 220. As long as the function pointers remain encoded, any attempt by a potential attacker to overwrite an encoded function pointer will point to a false location when the overwritten function pointer is decoded to a random location rather than to the code that the attacker wishes to execute. The method therefore can block the attacker from obtaining program execution of the portion of the computer program associated with the overwritten function pointer target, thereby thwarting the attack. One of ordinary skill in the art will recognize that the value may be a random value, an environment specific variable, or other values known to those of skill in the art. Possible environment specific variables include but are not limited to a processor serial number and a process identifier. The value may be non-deterministic.

In certain embodiments, the step of encoding a first set of function pointers with a value 220 includes generating an encoder for use in encoding. The encoder may be implemented in certain embodiments as a series of software instructions for encoding the first set of function pointers with the value. The step of encoding may be performed at least in part by an operating system and also or alternately may be performed at least in part by a processor and also or alternatively by the application.

In certain embodiments, the step of encoding 220 may include performing a reversible transformation on each function pointer in the first set with respect to the value. The reversible transformation may include without limitation a bitwise exclusive-or operation, bitwise rotations, integer divisions, modulo operations or other reversible transformations known to those of ordinary skill in the art.

In certain embodiments, at least one of the first set of function pointers may be decoded. The step of decoding may be performed using the value. In certain embodiments, the step of decoding 230 occurs before executing executable code associated with an encoded function pointer. In certain embodiments, the step of decoding at least one of the first set of function pointers 230 includes generating a decoder for use in decoding. The decoder may be implemented in certain embodiments as a series of software instructions for decoding at least one of the first set of function pointers. As an additional security measure, a new value may be generated each time a computer program is initialized such that the value can only be used for decoding function pointers for one instance of a program to reduce the opportunity for an attacker to discover the value and use it to decode encoded function pointers. The step of decoding may be performed at least in part by an operating system and also or alternately may be performed at least in part by a processor and also or alternatively may be performed at least in part by the application.

In certain embodiments, the step of decoding 230 may include performing a reversible transformation on at least one function pointer in the first set with respect to the value. The reversible transformation may include without limitation a bitwise exclusive-or operation, bitwise rotations, integer divisions, modulo operations or other reversible transformations known to those of ordinary skill in the art. Each of the first set of function pointers may be decoded or only some subset of the first set of function pointers may be decoded. Optionally, the first set of encoded function pointers may be decoded only if and as called by instructions that point to one of the encoded function pointer targets or instructions that modify the control flow that access any of the encoded function pointer targets. Once a particular function pointer has been decoded, a dynamic function call to the decoded function pointer 240 can be executed.

In certain embodiments, the target of one or more of the first set of function pointers may be executable code. In certain embodiments, the target of each of the first set of function pointers may be executable code.

In certain embodiments, the encoder and/or decoder mentioned above may be generated at least in part by a compiler.

Figure 3:
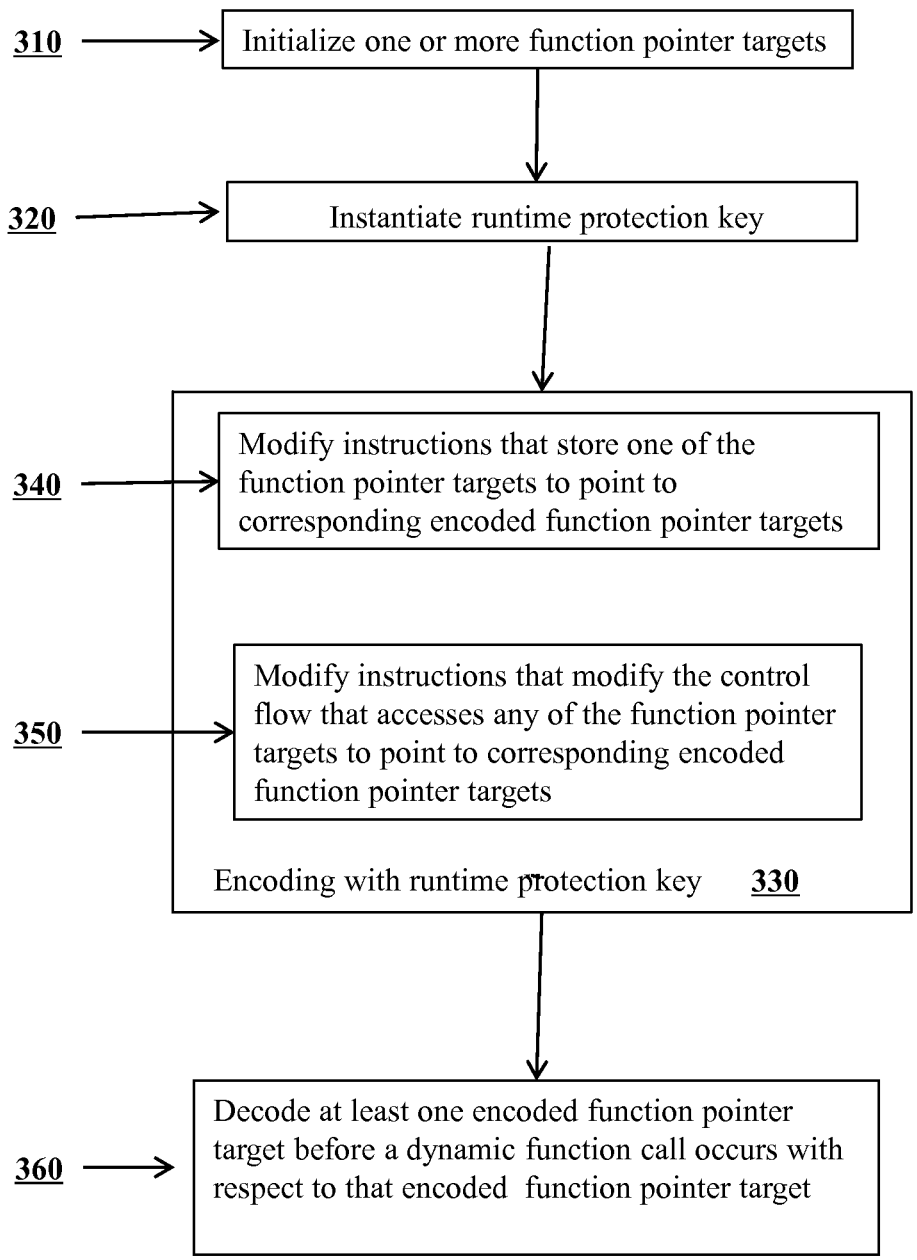
FIG. 3 illustrates a block diagram of a method for mitigating a function pointer overwrite attack on a portion of a computer program in accordance with certain embodiments of the present invention.

As shown in FIG. 3, a method of mitigating a function pointer overwrite attack 300 may include the steps of selecting one or more function pointer targets 310, instantiating a runtime protection key 320, and encoding one or more function pointer targets with the runtime protection key 330.

In certain embodiments, the step of encoding 330 may include modifying one or more instructions that store one of the function pointer targets to point to corresponding encoded function pointer targets 340. In certain embodiments, the step of encoding 330 may include modifying one or more instructions that modify the control flow that accesses at least one of the one or more function pointer targets to point to corresponding encoded function pointer targets 350.

In certain embodiments, the step of encoding a first set of function pointers with a value 330 includes generating an encoder for use in encoding. The encoder may be implemented in certain embodiments as a series of software instructions for encoding the first set of function pointers with the value. The step of encoding may be performed at least in part by an operating system and also or alternately may be performed at least in part by a processor and also or alternatively may be performed at least in part by the application.

In certain embodiments, the steps 330 or 340 may include performing the following steps, which may be performed at compile time by a compiler:

Initialize list of all dynamic instruction targets (functions) suitable for protection at module initialization.

Create pre-main stub to initialize runtime protection key into either the Process Environment Block (PEB) (Similar to generation of _security_cookie), a dedicated register, or other known memory location Expand all instructions that store the function pointer in a memory location/register such as mov [target], function_address into:
    mov register, function_address
    xor register, [runtime_protection_key]
    mov [target], register Expand all instructions that dynamically modify the control flow that are supposed to access protected functions such as call register or jmp register into:
    xor register, [runtime_protection_key]
    call/jmp register In certain embodiments, the following steps may be taken by the compiler on the pre-main execution stub:

Initialize runtime_protection_key in to the Process Environment Block (PEB)/dedicated register/other known memory location to a random value.

Iterate through list of dynamic call instructions and encode addresses with the runtime_protection_key.

Execute main( ).

In certain embodiments, an operating system may be used to store a list of function call instructions in the binary headers and/or the execution stub functionality may be implemented by the operating systems program loader.

In certain embodiments of method 300, at least one encoded function point may be decoded before a dynamic function call occurs with respect to that encoded function pointer target 360. Each of the encoded function pointers may be decoded or only some subset of function pointers encoded in steps 340 and/or 350 may be decoded. Optionally, the encoded function pointers may be decoded only if and as called by instructions that point to one of the encoded function pointer targets or instructions that modify the control flow that access any of the encoded function pointer targets. Once a particular encoded function pointer has been decoded, a dynamic function call to the decoded function pointer 360 can be executed.

In certain embodiments, the step of decoding at least one of the first set of function pointers 360 includes generating a decoder for use in decoding. The decoder may be implemented in certain embodiments as a series of software instructions for decoding at least one of the first set of function pointers. As an additional security measure, a new value may be generated each time a computer program is initialized such that the value can only be used for decoding function pointers for one instance of a program to reduce the opportunity for an attacker to discover the value and use it to decode encoded function pointers. The step of decoding may be performed at least in part by an operating system and also or alternately may be performed at least in part by a processor.

In certain embodiments, the target of one or more of the first set of function pointers may be executable code. In certain embodiments, the target of each of the first set of function pointers may be executable code.

In certain embodiments, the encoder and/or decoder mentioned above may be generated at least in part by a compiler.

In certain embodiments, the step 350 may include performing the following steps:

Expand all instructions that store the function pointer in a memory location/register such as mov [target], function_address into:

mov register, function_address
xor register, [runtime_protection_key]
mov [target], register One of ordinary skill in the art will recognize that any of the forgoing systems and methods can be implemented on one or more computer readable media as sets of instructions for mitigating a function pointer overwrite attack on a portion of a computer program and that such embodiments are within the scope of certain embodiments of the present invention.

One of ordinary skill in the art will recognize that any of the forgoing systems and methods can be implemented in a system comprising one or more processors and that such embodiments are within the scope of certain embodiments of the present invention.

For the purposes of this disclosure, references to a processor include a central processing unit, one or more processors, one or more processing cores, and/or other processing units known to those of ordinary skill in the art within the scope of certain embodiments of the present invention.

While the above description contains many specifics, these should not be construed as limitations on the scope of the invention, but rather as an exemplification of certain embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A method for mitigating a function pointer overwrite attack on a portion of a computer program, comprising:
   selecting one or more function pointer targets;
   allocating a space in front of each of the one or more function pointer targets in a computer readable medium;
   instantiating a runtime protection key for one or more of the function pointer targets;
   storing a first copy of the runtime protection key in a known secure memory location;
   storing a second copy of the runtime protection key in the allocated space prior to each of the one or more function pointer targets;
   comparing a value in the allocated space in front of at least one of the function pointer targets when an instruction is called that accesses the at least one of the function pointer targets to the first copy of the runtime protection key; and
   generating an error if the value in the space in front of any of the at least one of the function pointer targets does not match the first copy of the runtime protection key or executing the instruction if the value in the space in front of the at least one of the function pointer targets matches the first copy of the runtime protection key;
   wherein the runtime protection key is derived from at least one of a combination of and a transformation of a plurality of values and, wherein the plurality of values comprises one or more of a function pointer address and a load time generated value.

2. The method of claim 1, wherein instantiating a runtime protection key comprises initializing the runtime protection key to a second value.

3. The method of claim 2 wherein the second value is non-deterministic.

4. The method of claim 1, wherein the plurality of values comprises one or more of a function pointer address and a load time generated value unique to a function pointer target.

5. The method of claim 1, wherein instantiating a runtime protection key comprises initializing the runtime protection key to a function pointer address of one of the function pointer targets.

6. The method of claim 5, wherein storing the runtime protection key comprises storing the one of the function pointer targets in the allocated space in front of a corresponding function pointer target.

7. The method of claim 1, wherein instantiating a runtime protection key for one or more of the function pointer targets comprises initializing the runtime protection key to a load time generated value unique to a corresponding function pointer target.

8. The method of claim 7, wherein storing the runtime protection key comprises storing the load time generated value in the allocated space in front of the corresponding function pointer target.

9. The method of claim 1, wherein the step of selecting one or more function pointer targets comprises selecting one or more function pointer targets for protection.

10. The method of claim 1, wherein the instruction stores at least one of the function pointer targets to point to the at least one protected function pointer targets.

11. The method of claim 1, wherein the instruction modifies the control flow that accesses at least one of the protected function pointer targets to point to at least one function pointer targets.

12. The method of claim 2, wherein the second value comprises a random value.

13. The method of claim 2, wherein the second value comprises a processor instruction.

14. The method of claim 2, wherein the second value comprises an environment specific identifier.

15. The method of claim 14, wherein the environment specific identifier comprises a selected one of a processor serial number and a process identifier.

16. The method of claim 2, wherein the second value can only be used for the step of comparing function pointers for one instance of a program.

17. The method of claim 2, wherein the second value is dynamic.

18. The method of claim 1, wherein the step of comparing occurs before executing executable code associated with the function.

19. The method of claim 1, wherein at least one of the steps of allocating, instantiating and storing are performed at least in part by a compiler.

20. The method of claim 19, wherein at least one of the steps of allocating, instantiating and storing is performed at least in part by an operating system.

21. The method of claim 19, wherein the step of comparing is performed at least in part by an operating system.

22. The method of claim 19, wherein at least one of the steps of allocating, instantiating and storing is performed at least in part by a processor.

23. The method of claim 19, wherein at least one of the steps of allocating, instantiating and storing is performed at least in part by an application.

24. The method of claim 19, wherein the step of comparing is performed at least in part by a processor.

25. The method of claim 19, wherein the step of comparing is performed at least in part by an application.

26. The method of claim 1, wherein a target of each of the first set of function pointers is executable code.

27. A non-transitory computer readable medium containing instructions for mitigating a function pointer overwrite attack on a portion of a computer program, comprising instructions for execution by one or more processors for:
selecting one or more function pointer targets for protection;
allocating a space in front of each of the one or more function pointer targets in a computer readable medium;
instantiating a runtime protection key for one or more of the function pointer targets;
storing a first copy of the runtime protection key in a known secure memory location;
storing a second copy of the runtime protection key in the allocated space in front of each of the one or more function pointer targets;
comparing a value in the space in front of at least one of the function pointer targets when an instruction is called that dynamically modifies the control flow to access the at least one of the function pointer targets to the first copy of the runtime protection key; and
generating an error if the value in the space in front of any of the at least one of the function pointer targets does not match the first copy of the runtime protection key or
executing the instruction if the value in the space in front of each of the at least one of the function pointer targets matches the first copy of the runtime protection key;
wherein the runtime protection key is derived from at least one of a combination of and a transformation of a plurality of values and, wherein the plurality of values comprises one or more of a function pointer address and a load time generated value.

28. The non-transitory computer readable medium of claim 27, wherein instantiating a runtime protection key comprises initializing the runtime protection key to a second value.

29. The non-transitory computer readable medium of claim 28, wherein the second value is non-deterministic.

30. The non-transitory computer readable medium of claim 27, wherein the plurality of values comprises one or more of a function pointer address and a load time generated value unique to a function pointer target.

31. The non-transitory computer readable medium of claim 27, wherein instantiating a runtime protection key comprises initializing the runtime protection key to a function pointer address of one of the function pointer targets.

32. The non-transitory computer readable medium of claim 31, wherein storing the runtime protection key comprises storing the one of the function pointer targets in the allocated space in front of a corresponding function pointer target.

33. The non-transitory computer readable medium of claim 27, wherein instantiating a runtime protection key for one or more of the function pointer targets comprises initializing the runtime protection key to a load time generated value unique to a corresponding function pointer target.

34. The non-transitory computer readable medium of claim 33, wherein storing the runtime protection key comprises storing the load time generated value in the allocated space in front of the corresponding function pointer target.

35. The non-transitory computer readable medium of claim 27, wherein selecting one or more function pointer targets comprises selecting one or more function pointer targets for protection.

36. The non-transitory computer readable medium of claim 27, wherein the instruction stores at least one of the function pointer targets to point to the at least one protected function pointer targets.

37. The non-transitory computer readable medium of claim 27, wherein the instruction modifies the control flow that accesses at least one of the protected function pointer targets to point to at least one function pointer targets.

38. The non-transitory computer readable medium of claim 28, wherein the second value comprises a random value.

39. The non-transitory computer readable medium of claim 28, wherein the second value comprises a processor instruction.

40. The non-transitory computer readable medium of claim 28, wherein the second value comprises an environment specific identifier.

41. The non-transitory computer readable medium of claim 40, wherein the environment specific identifier comprises a selected one of a processor serial number and a process identifier.

42. The non-transitory computer readable medium of claim 28, wherein the second value can only be used by the instructions for comparing function pointers for one instance of a program.

43. The non-transitory computer readable medium of claim 28, wherein the second value is dynamic.

44. The non-transitory computer readable medium of claim 27, wherein the instructions for comparing are executed before executing executable code associated with the function.

45. The non-transitory computer readable medium of claim 27, wherein at least one of the instructions for allocating, instantiating and storing is executed at least in part by a compiler.

46. The non-transitory computer readable medium of claim 45, wherein at least one of the instructions for allocating, instantiating and storing is executed at least in part by an operating system.

47. The non-transitory computer readable medium of claim 45, wherein the instructions for comparing are executed at least in part by an operating system.

48. The non-transitory computer readable medium of claim 45, wherein at least one of the instructions for allocating, instantiating and storing is executed at least in part by an application.

49. The non-transitory computer readable medium of claim 45, wherein the instructions for comparing are executed at least in part by an application.

50. The non-transitory computer readable medium of claim 45, wherein at least one of the instructions for allocating, instantiating and storing is executed at least in part by a processor.

51. The non-transitory computer readable medium of claim 45, wherein the instructions for comparing are performed at least in part by a processor.

52. The non-transitory computer readable medium of claim 27, wherein a target of each of the first set of function pointers is executable code.

* * * * *